United States Patent
Chewter et al.

(10) Patent No.: US 12,515,495 B2
(45) Date of Patent: Jan. 6, 2026

(54) AUTOMOTIVE SEAT BASED MICROCLIMATE SYSTEM

(71) Applicant: GENTHERM INCORPORATED, Novi, MI (US)

(72) Inventors: Alan Chewter, Ypsilanti, MI (US); Satya Mandali, West Bloomfield, MI (US); Mobashar Ahmad, Troy, MI (US); Ankit Tiwari, Farmington Hills, MI (US); Tyler Myers, Plymouth, MI (US); Chad Westerman, Milford, MI (US)

(73) Assignee: GENTHERM INCORPORATED, Novi, MI (US)

( * ) Notice: Subject to any disclaimer, the term of this patent is extended or adjusted under 35 U.S.C. 154(b) by 358 days.

(21) Appl. No.: 18/277,507

(22) PCT Filed: Mar. 11, 2022

(86) PCT No.: PCT/US2022/019951
§ 371 (c)(1),
(2) Date: Aug. 16, 2023

(87) PCT Pub. No.: WO2022/197549
PCT Pub. Date: Sep. 22, 2022

(65) Prior Publication Data
US 2024/0140170 A1    May 2, 2024

Related U.S. Application Data

(60) Provisional application No. 63/161,712, filed on Mar. 16, 2021.

(51) Int. Cl.
*B60H 1/00* (2006.01)
*B60H 1/22* (2006.01)

(52) U.S. Cl.
CPC ....... *B60H 1/00878* (2013.01); *B60H 1/0073* (2019.05); *B60H 1/2218* (2013.01); *B60H 2001/2265* (2013.01)

(58) Field of Classification Search
CPC .............. B60H 1/00878; B60H 1/0073; B60H 1/2218; B60H 2001/2265
(Continued)

(56) References Cited

U.S. PATENT DOCUMENTS 6,454,178 B1 * 9/2002 Fusco .................... B60H 1/008
165/203
10,821,805 B2   11/2020 Gallagher
(Continued)

FOREIGN PATENT DOCUMENTS

| DE | 112015004914 T5 | 7/2017 |
| DE | 102019109370 A1 | 10/2019 |
| JP | H0649412 B2 | 6/1994 |

OTHER PUBLICATIONS

International Search Report and Written Opinion for International Application No. PCT/US2022/019951 mailed Jun. 30, 2022.
(Continued)

*Primary Examiner* — Jigneshkumar C Patel
(74) *Attorney, Agent, or Firm* — Carlson, Gaskey & Olds, P.C.

(57) ABSTRACT

A microclimate system for a vehicle occupant includes multiple microclimate thermal effectors. Each of the microclimate communication with the microclimate thermal effectors and includes a plurality of first transfer functions. Each of the first transfer functions models a corresponding microclimate thermal effector in the plurality of microclimate thermal effectors. A system transfer function models the microclimate system. Each of the first transfer functions is nested within the system transfer function.

20 Claims, 9 Drawing Sheets

(58) Field of Classification Search
USPC .......................................................... 700/300
See application file for complete search history.

(56) References Cited

U.S. PATENT DOCUMENTS

| | | | |
|---|---|---|---|
| 2015/0158368 A1* | 6/2015 | Herr-Rathke | B60H 1/00964 |
| | | | 701/2 |
| 2015/0375653 A1 | 12/2015 | Josefsson et al. | |
| 2017/0368907 A1* | 12/2017 | Yoneda | B60H 1/00742 |
| 2020/0198441 A1 | 6/2020 | Belkaid et al. | |
| 2020/0317024 A1* | 10/2020 | Kaushik | B60H 1/0073 |

OTHER PUBLICATIONS

International Preliminary Report on Patentability for International Application No. PCT/US2022/019951 mailed Sep. 28, 2023.

* cited by examiner

| | | 910 | 920 | 930 | 940 | 950 | 960 | 970 | 980 |
|---|---|---|---|---|---|---|---|---|---|
| | 6 | G | 0.7 | 0.7 | 0.49 | 350 | 5775 | 0 | 984 |
| | 5 | F | 1 | 0.5 | 0.5 | 400 | 5425 | 0 | |
| | 4 | E | 1 | 0.5 | 0.5 | 4500 | 5025 | 3475 | 986 |
| | 3 | D | 0.8 | 0.8 | 0.64 | 80 | 525 | NO LIM | |
| | 2 | C | 1.3 | 0.7 | 0.91 | 190 | 445 | NO LIM | 982 |
| | 1 | B | 1.2 | 0.85 | 1.02 | 135 | 255 | NO LIM | |
| | 0 | A | 1.5 | 0.8 | 1.2 | 120 | 120 | NO LIM | |

FIG.9

AUTOMOTIVE SEAT BASED MICROCLIMATE SYSTEM

CROSS-REFERENCE TO RELATED APPLICATION

This application claims priority to U.S. Provisional Patent Application No. 63/161,712 filed on Mar. 16, 2021.

TECHNICAL FIELD

This disclosure relates to a microclimate system that provides increased thermal comfort to the occupant and more particularly to a control system for driving thermal comfort using the microclimate system.

BACKGROUND

In traditional automotive HVAC or climate systems, the control system uses temperatures from sensors mounted in different locations within the cabin or calculates temperature using a mathematical cabin thermal model. In recent years, seat-based microclimate systems have become more desirable because of their fast time to comfort and lower energy consumption compared to prior systems.

An automotive seat-based microclimate system has many conductive, convective and radiative devices, like heater mats, thermo-electric devices (TED)s, positive temperature coefficient thermistors (PTCs) and mini-compressor systems located in the seat and surrounding area. The various microclimate systems are referred to collectively herein as "thermal effectors". Driving thermal change using the multiple local heating/cooling device control is important for controlling local thermal comfort, but is difficult to achieve with current systems which independently model and control each thermal effector.

The current methods for automotive seat-based microclimate systems are discrete ON/OFF or modulated power (PWM) control based on fixed temperature setpoints (typically 3 to 5 discrete levels). Each thermal effector is controlled based on the temperature setpoints using a control model that considers only the thermal effector being controlled. The current control models do not account for thermal effectiveness or power limits, and rely on the user to select combinations of devices or empirical testing to determine groupings of thermal effectors to achieve a desired comfort level. Further, current systems do not distinguish between a "global" thermal value and local/individual thermal values and do not effectively prioritize or rank the thermal effectors within the system based on what type of comfort is desired.

SUMMARY

In one exemplary embodiment a microclimate system for a vehicle occupant includes multiple microclimate thermal effectors, each of the microclimate thermal effectors having a corresponding thermal effector controller and being configured to at least partially control an occupant thermal comfort, each of the microclimate thermal effectors including at least one sensor configured to determine a microclimate parameter corresponding to at least one microclimate thermal effector of the multiple microclimate thermal effectors, and a microclimate system controller in communication with the microclimate thermal effectors, the microclimate system controller including a plurality of first transfer functions, each of the first transfer functions modeling a corresponding microclimate thermal effector in the plurality of microclimate thermal effectors, and a system transfer function modeling the microclimate system, wherein each of the first transfer functions is nested within the system transfer function such that the system transfer function models the microclimate system including at least a portion of the impact each thermal effector has on each other thermal effector.

In another example of the above described microclimate system for a vehicle occupant at least one of the microclimate thermal effectors corresponds to at least two of the first transfer functions.

In another example of any of the above described microclimate systems for a vehicle occupant a first of the at least two transfer functions models a heating operation of the at least one of the microclimate thermal effector.

In another example of any of the above described microclimate systems for a vehicle occupant a second of the at least two transfer functions models a cooling operation of the at least one of the microclimate thermal effector.

In another example of any of the above described microclimate systems for a vehicle occupant the nesting of the first transfer functions within the system transfer functions includes utilizing outputs of the nested first transfer functions as inputs of the system transfer function.

In another example of any of the above described microclimate systems for a vehicle occupant the microclimate system controller is configured to subtract an output of the system transfer function from an occupant setpoint thereby generating a thermal comfort error for each microclimate thermal effector and providing each thermal comfort error to the controller of the corresponding microclimate thermal effector.

In another example of any of the above described microclimate systems for a vehicle occupant each of the first transfer functions provides an output to the corresponding thermal effector controller.

In another example of any of the above described microclimate systems for a vehicle occupant at least one thermal effector controller is a dedicated thermal effector controller.

In another example of any of the above described microclimate systems for a vehicle occupant at least one thermal effector controller is a dedicated subcomponent of the microclimate system controller.

In another example of any of the above described microclimate systems for a vehicle occupant the system transfer function includes a heating operations model and a cooling operations model.

In another example of any of the above described microclimate systems for a vehicle occupant the microclimate thermal effectors are selected from the group comprising climate controlled seats, head rest/neck conditioner, climate controlled headliner, steering wheel, heated gear shifter, heater mat, and mini-compressor system.

In another example of any of the above described microclimate systems for a vehicle occupant the multiple microclimate thermal effectors includes at least one convective thermal effector and at least one conductive thermal effector.

An exemplary method for controlling a microclimate system having multiple thermal effectors, the method includes determining an occupant comfort level setpoint for the microclimate system, determining device setpoints for each of the thermal effectors based on the occupant comfort level setpoint, and controlling the thermal effectors to the corresponding device setpoints using a feedback control loop, the feedback control loop including a system transfer function and a plurality of device transfer functions where each of the plurality of device transfer functions is nested in the system transfer function, the device transfer functions each modeling individual thermal effectors and the system transfer function modeling an affect each individual thermal effector has on the effectiveness of each other thermal effector.

Another example of the above described method for controlling a microclimate system having multiple thermal effectors further includes measuring a plurality of parameters using a plurality of sensors and providing the measured parameter to an input of at least one device transfer function of the plurality of device transfer functions.

In another example of any of the above described methods for controlling a microclimate system having multiple thermal effectors each transfer function of the plurality of transfer functions receives at least one parameter of the plurality of measured parameters and provides at least one output to an input of the system transfer function.

In another example of any of the above described methods for controlling a microclimate system having multiple thermal effectors the feedback control loop includes comparing an output of the system transfer function to the determined device setpoints to determine at least one error value corresponding to each thermal effector and providing the error value to a corresponding thermal effector controller.

In another example of any of the above described methods for controlling a microclimate system having multiple thermal effectors the feedback control loop further includes providing the at least one output of each device transfer function to the corresponding thermal effector controller, the at least one output providing a calculated current thermal state including at least one of an occupant temperature and a heat flux.

In another example of any of the above described methods for controlling a microclimate system having multiple thermal effectors the calculated current thermal state defines at least an occupant temperature and a heat flux.

In another example of any of the above described methods for controlling a microclimate system having multiple thermal effectors at least two of the plurality of device transfer functions correspond to a single thermal effector, with a first of the at least two device transfer functions modeling heating operations of the thermal effector and a second of the at least two transfer functions modeling cooling operations of the thermal effector.

In another example of any of the above described methods for controlling a microclimate system having multiple thermal effectors the multiple thermal effectors includes at least one convective thermal effector and at least one conductive thermal effector.

In another example of any of the above described microclimate systems the controller determines a unique estimated local equivalent temperature for each of the selected microclimate thermal effectors based upon the equation.

BRIEF DESCRIPTION OF THE DRAWINGS

The disclosure can be further understood by reference to the accompanying drawings, comprising FIGS. 1-12.

FIG. 9 illustrates an exemplary weighting table for the control architecture of FIG. 8.

The embodiments, examples and alternatives of the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure relates to a microclimate system that provides increased thermal comfort to the occupant by controlling microclimate thermal effectors to generate a desired comfort level.

Figure 1:
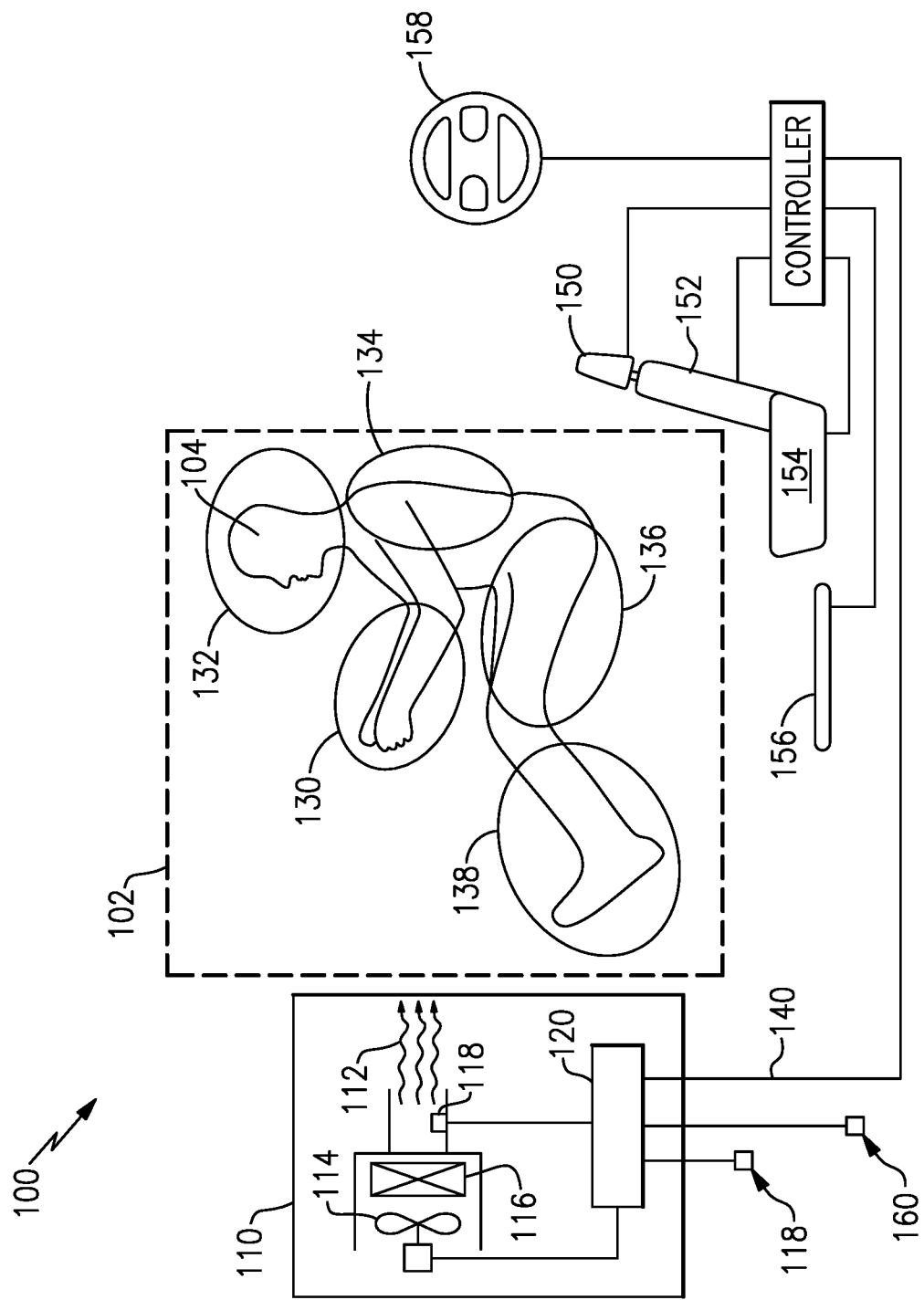
FIG. 1 schematically illustrates a vehicle heating ventilation and cooling microclimate system.

Referring to FIG. 1, a vehicle 100 has a heating, ventilation and air conditioning (HVAC) system 110 that is used to condition the air 112 and control the bulk temperature of the air within the vehicle cabin 102. A typical HVAC system 110 has ducting that supplies conditioned air 112 to the cabin 102 using a blower 114 moving air over a heat exchanger 116. A sensor 118 monitors the temperature of the conditioned cabin air 112, and a controller 120 regulates operation of the HVAC system 110 to a temperature set point that is typically manually adjusted by an occupant 104. The central HVAC 110 system is insufficient to achieve thermal comfort for each specific occupant 104 and location in many scenarios, such as those where multiple different occupants 104 are in the same cabin 102, so microclimate devices or thermal effectors are used to create a unique microclimate for each occupant 104 in the cabin 102, thereby providing improved overall thermal comfort for each occupant 104.

As a further challenge to providing an effective climate control system, each occupant 104 typically has unique personal comfort preferences. That is, a particular occupant 104 detects a level of thermal energy differently than another occupant 104. As a result, the exact same thermal environment within a vehicle 100 may be perceived as comfortable by one occupant 104, but as uncomfortable by another occupant 104.

Microclimate thermal effectors are localized components that can adjust or maintain a desired microclimate in a corresponding zone 130, 132, 134, 136, 138. The microclimate thermal effectors can include, for example, climate controlled seats (e.g., U.S. Pat. Nos. 5,524,439 and 6,857,697), a head rest/neck conditioner (e.g., U.S. Provisional App. No. 62/039,125), a climate controlled headliner (e.g., U.S. Provisional App. No. 61/900,334), a steering wheel (e.g., U.S. Pat. No. 6,727,467 and U.S. Pub. No. 2014/0090513), a heated gear shifter (e.g., U.S. Pub. No. 2013/0061603, etc.), heater mats, a mini-compressor system, and/or any other systems configured to achieve a personalized microclimate. The enumerated microclimate thermal effectors are exemplary in nature and are non-limiting. The microclimate system provides a corresponding occupant 104 personal comfort in an automated manner with little or no input from the corresponding occupant 104. All or some of the microclimate thermal effectors can be arranged to optimally control the thermal environment around an occupant of a seat located anywhere inside a passenger vehicle. In addition, the microclimate thermal effectors can be used to regulate thermal comfort separately for individual segments of the occupant's body.

In the example of FIG. 1, the occupant comfort is controlled using the range of thermal effectors. The thermal effectors transfer heat to (heating) or from (cooling) the occupant to achieve a desired level of personal thermal comfort, according to occupant preference and local environmental conditions. Some thermal effectors are capable of providing both the heating and cooling functions, and the different thermal effectors achieve their heating and cooling operations using different methodologies including, but not limited to, radiation, conduction or convection, or a combination of these. Further, some of the thermal effectors are able to impact the entire vehicle cabin, while others will have a localized impact limited to the occupant, or a portion of the occupant, in the immediate vicinity of the thermal effector.

Thermal effectors contained within an occupant seat may have heat characteristics that depend on the installation in the seat. By way of example, conductive devices may transfer heat through a layer of insulating material such as foam, fabric, or leather trim with the amount and types of these materials controlling the effectiveness of the thermal effector. Similarly, convective devices may push or pull conditioned air through vented layers of a seat suspension system.

Even further, when thermal devices are configured to affect a seat occupant in a dependent fashion (i.e. the effectiveness of one thermal effector depends on the operations of another thermal effector), the thermal calculations and device controls are most effective if they account for those dependencies. The control algorithm described herein (which includes an estimator and a controller) simultaneously solves three problems. First, the controller determines how to most effectively split the control signal between the dependent devices. Second, the estimator determines the magnitude of effect of one device on the other. Third, to control the overall system, the estimator determines the combined effect on the occupant of several devices so that the controller can ensure that the overall system objectives are met. The combined effect necessarily includes the impact each thermal effector has on the heat transfer rates and thermal effectiveness of nearby thermal effectors.

The HVAC system 110 of FIG. 1 uses a control algorithm including thermodynamic models of the heat transfer from the thermal effectors to their environment and then combines these calculated heat transfer rate quantities with a seat level model to determine the combined heat transfer rate to the occupant of the seat. The control algorithm accounts for the dependencies effecting thermal device control and thermal state modeling using nested transfer functions. The nested transfer functions refers to the utilization of component transfer functions to model operations of each thermal effector, and a system level transfer function to model system operations including the output of each of the component transfer functions. By doing so, the algorithm improves the control effectiveness and efficiency. While applied to thermal devices within a seat thermal control sub-system herein, the concepts described can be applied to any scenario where multiple thermal devices are combined to drive thermal change in a single system.

Figure 2:
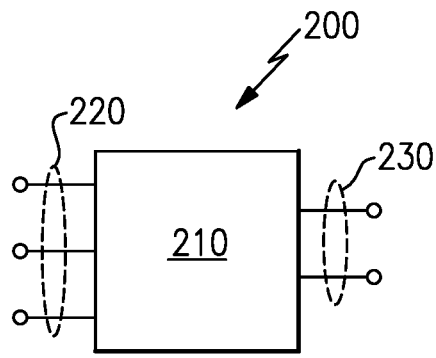
FIG. 2 schematically illustrates an example thermal effector transfer function.

With continued reference to FIG. 1, each of the thermal effectors is modeled individually using a transfer function 210 that represents how the thermal effector physically operates. A schematic example of this is included at FIG. 2. The transfer function 210 is a real time calculation that uses variables 220 to determine a current thermal state of the system 200 being modeled. The inputs 220 correspond to real time measured parameters of the thermal effector, as well as inputs indicative of the environment in which the thermal effector is positioned and the configuration data of the thermal effector. The inputs are provided to a thermodynamic or physics model within the transfer function 210 and the transfer function 210 converts the data into a set of outputs 230 that represent the current thermal state of the thermal effector. The outputs provide feedback to the controller driving the thermal effector. In a conventional system, the outputs 230 of the transfer function 210 are used to drive the physical system of the thermal effector in a feedback loop.

Within the context of FIG. 1, the overall seat system can be thermodynamically characterized in a similar way as each thermal effector, with the transfer functions of each thermal effector being nested within a transfer function of the seat. The seat system takes inputs from outside the subsystem (e.g., exterior temperature, seat occupancy, etc.) as well as the outputs from nested transfer functions (alternatively referred to as component transfer functions). The seat system 310 provides a transfer function including a model of the impact that each thermal effector has on the other thermal effectors in the system.

Figure 3:
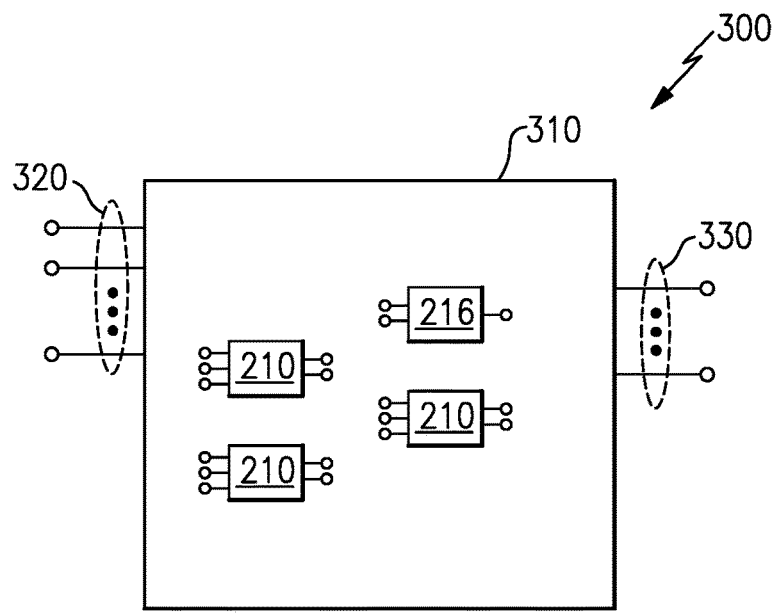
FIG. 3 schematically illustrates a vehicle system transfer function including multiple thermal effectors.

The architectural design approach of using nested sub-system models built from component transfer functions allows for an efficient re-use of software defining the component transfer functions and is illustrated in FIG. 3. The top-level transfer function 310 of the seat system identifies the heat transfer rates and temperatures at a contact with the seat occupant, and allows for the impact of each component transfer function 210 on each other component transfer function 210 to be considered within the system transfer function 310.

Figure 4:
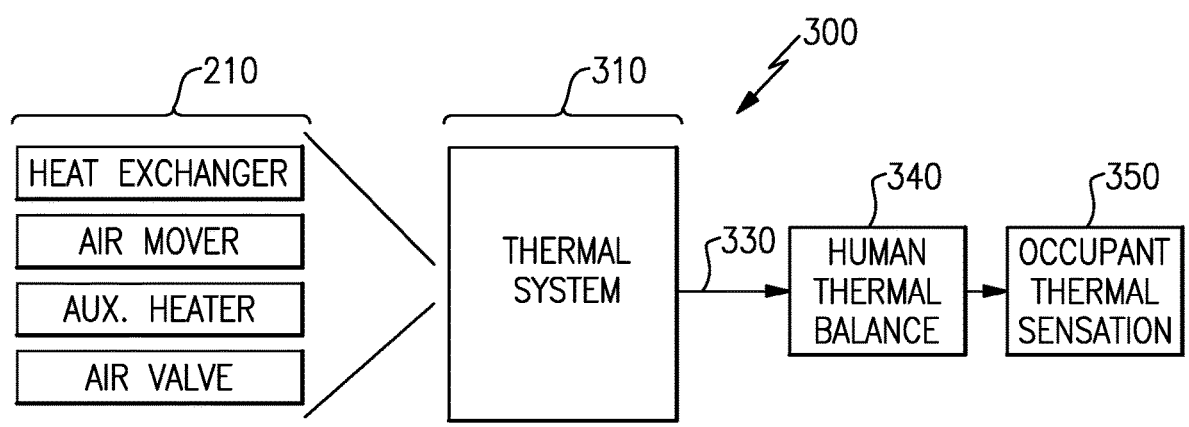
FIG. 4 schematically illustrates an alternative representation of the vehicle system of FIG. 3.

FIG. 4 provides an alternate illustration of the system 310 applied to a convective thermal air system 300. The convective thermal air system 300 includes multiple component transfer functions 210 defining the operations of a heat exchanger, an air mover (e.g. a fan), an auxiliary air heater, and an air valve. Alternative systems include alternative components, but are arranged in a similar structure and operate in a similar fashion. Each of the component transfer functions 210 provides outputs to the thermal system transfer function 310. The thermal system transfer function 310 which generates an output capable of driving human thermal balance, and ultimately occupant thermal sensation 350. The utilization of the component transfer functions 210 within the overall thermal system transfer function 310 allows the algorithm to account for the impact that each component transfer function 210 has on each other component transfer function 210.

Figure 5:
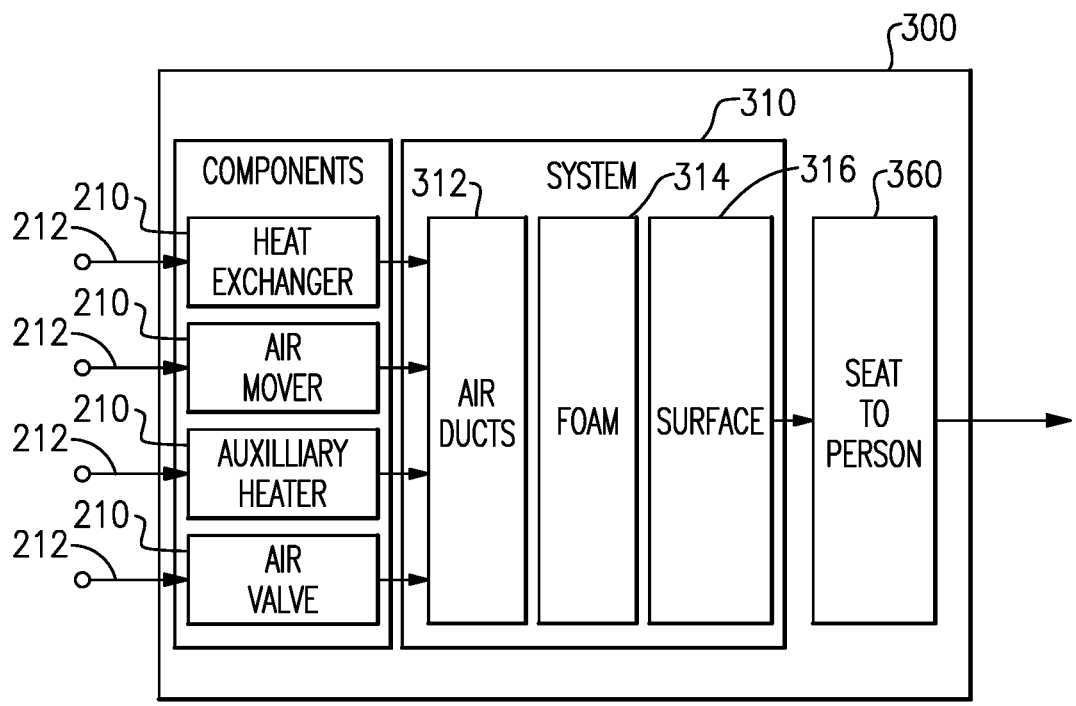
FIG. 5 schematically illustrates a more detailed representation of the vehicle system transfer function operations of FIG. 3.

FIG. 5 further expands the example of FIG. 4 including a more detailed representation of the system level transfer function 310 according to a specific example. As described above, the component transfer functions 210 are a set of transfer functions, each of which receives one or more measurements 212 corresponding to the specific component (e.g., heat exchanger, air mover, auxiliary heater, air valve, etc.) being modeled by the transfer function 210. The component transfer functions 210 provide outputs to the system transfer function 310. The system transfer function 310 includes portions that define the impact of air ducts 312, seating foam 314, and the seating surface material 316. In alternative implementations the portions can include other system factors depending on the factors impacting the given system. The calculations are run in real time, so that the current estimate of heat transfer rates and temperatures at the seat to person interface 360 can be adjusted to match the real time conditions. The transfer function 310 provides state estimates for the control of the individual devices within the system (the thermal effector transfer functions 210) as well as for the system 300 itself.

With continued reference to FIGS. 1-5, FIG. 6 schematically illustrates a control system 600 for controlling thermal effectors within a vehicle seat. Initially, inputs 610 are provided to a controller including the control system 600. The inputs 610 correspond to occupant setpoints (e.g. temperatures or comfort levels) and can be generated either directly by an occupant of the seat, or automatically via a general vehicle controller based on whether the seat is occupied or not and on whether the occupant has a known comfort profile. The inputs 610 are, in some examples, weighted according to the weighting process described below with regards to FIGS. 8-12. In other examples, the inputs 610 can be provided with static weighting that is predefined by the controller.

The inputs 610 are compared to the output of the system transfer function 310 via a comparison 620 to generate an error value 622. The error value 622 represents the difference between the commanded values (the inputs) and the actual system values (the output of the system transfer function 310). The error value 622 includes multiple signals, each of which is provided to a corresponding thermal effector system 602 including a thermal effector controller 630 that converts the error value into physical control signals 632 that drive the thermal effectors 640 to operate. One or more sensors throughout the thermal system, and in particular at the thermal effectors 640, measures the conditions at each of the thermal effectors 640, and provides the measured values to the component transfer functions 210 corresponding to that thermal effector 640. The component transfer function 210 then provides outputs to the system transfer function 310, in which it is nested, and to the controller 630 controlling the thermal effector 640.

The thermal effector system 602 is repeated for each individual thermal effector system within the microclimate system. In some examples the controller 630 is a dedicated controller for the corresponding thermal effector 640, while in other examples the controller 630 is a subcomponent of a microclimate system controller or general vehicle controller with the subcomponent being dedicated to control of the corresponding thermal effector 640.

Figure 6:
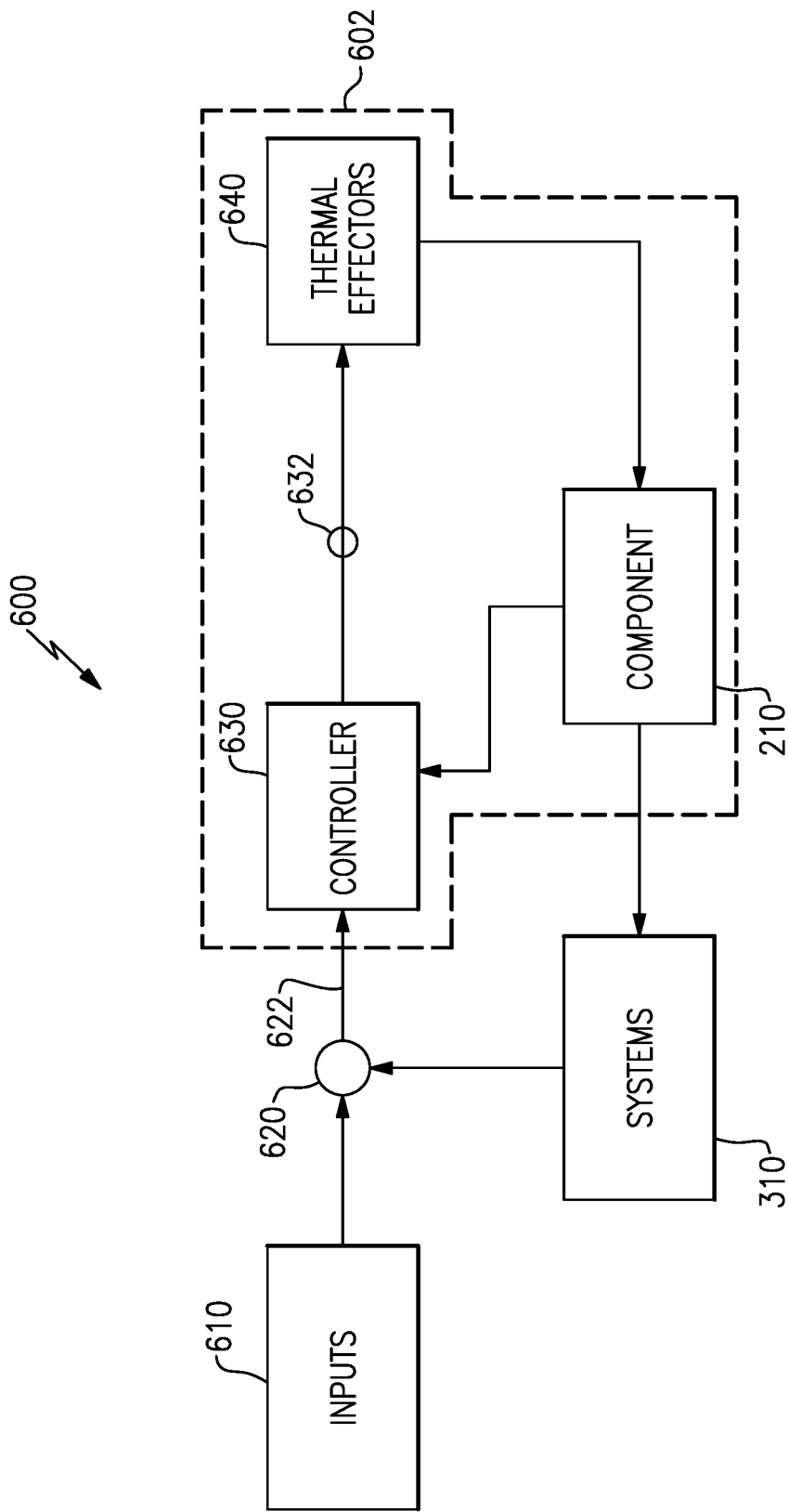
FIG. 6 schematically illustrates a control architecture for controlling the vehicle system transfer function of FIG. 3.
Figure 7:
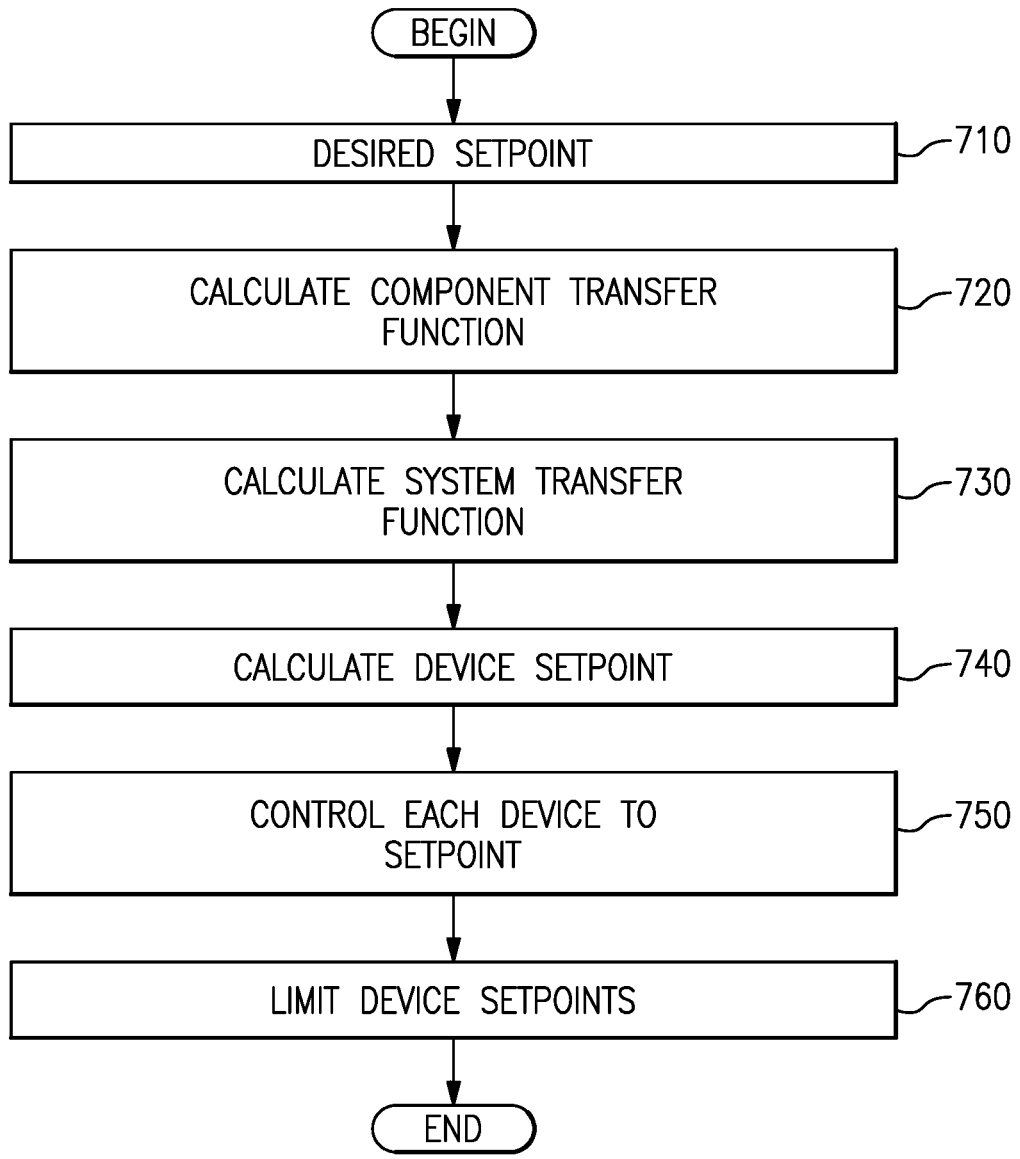
FIG. 7 is a flow diagram illustrating operations of the control architecture of FIG. 6.

The control structure and algorithms illustrated visually in FIGS. 2-6 results in the control operations illustrated in the flowchart 700 of FIG. 7. Initially, the occupant thermal comfort level is set in a "Desired Setpoint" action 710 where the controller uses the desired thermal comfort level to identify a desired seat surface temperature. In alternative examples including components in addition to or instead of the seat system, a corresponding thermal comfort setpoint can be utilized in place of the seat surface temperature.

Once the desired setpoint is calculated by the controller, the controller determines a transfer function for each device within the system in a "Calculate Component Transfer Function" action 720. The transfer functions are created using assumptions of quasi-steady state conditions and conventional techniques. The assumptions are based on the specifics of the thermal environment and the break down of the cabin (or other environmentally controlled area) into discrete zones. The heat transfer is calculated using a lumped thermal capacitance concept and the associated assumptions resulting in some portions of the thermal system being combined mathematically. The mathematical reduction (i.e., combination) of portions of the thermal system reflects similar behaviors across the portions and boundary conditions.

The component transfer functions utilize device outputs and heat transfer rates to model the behavior of the component as described above with regards to FIGS. 1-6. Each of the component transfer functions is then used by the controller to generate a system transfer function that determines the system output (e.g. seat surface temperature and heat transfer rate) from the outputs of each of the component transfer functions in a "Calculate System Transfer Function" 730.

Device setpoints for each of the thermal effectors are calculated using the current occupant temperatures and heat transfer rates calculated by the system transfer functions in a "Calculate Device Setpoint" action 740. The device setpoints are configured to minimize the difference between the occupant temperature and heat transfer rate calculated by the system transfer function versus the desired setpoint values. The device setpoints are then used to control the devices in a "Control Each Device to Setpoint" action 750. The controller uses the component transfer functions to provide calculated feedback values in a closed loop feedback control. In order to prevent runaway, or other potentially hazardous or inefficient operations of the thermal effectors, the controller imposes setpoint limits on each device in a "Limit Device Setpoints" action 760.

The forgoing description defines an exemplary thermal effector control system that accounts for the presence of multiple other thermal effectors in driving control of a thermal system. In some implementations the example of FIGS. 2-6 implements the control without consideration for available power, electrical efficiency, or other factors that may impact which thermal effector(s) to drive, and how to drive them. The advent of electric vehicles, and of semi-electric vehicles, adds an additional consideration of power usage, power budget, and the efficiency of converting electrical power to a desired thermal shift of any given thermal effector.

Figure 8:
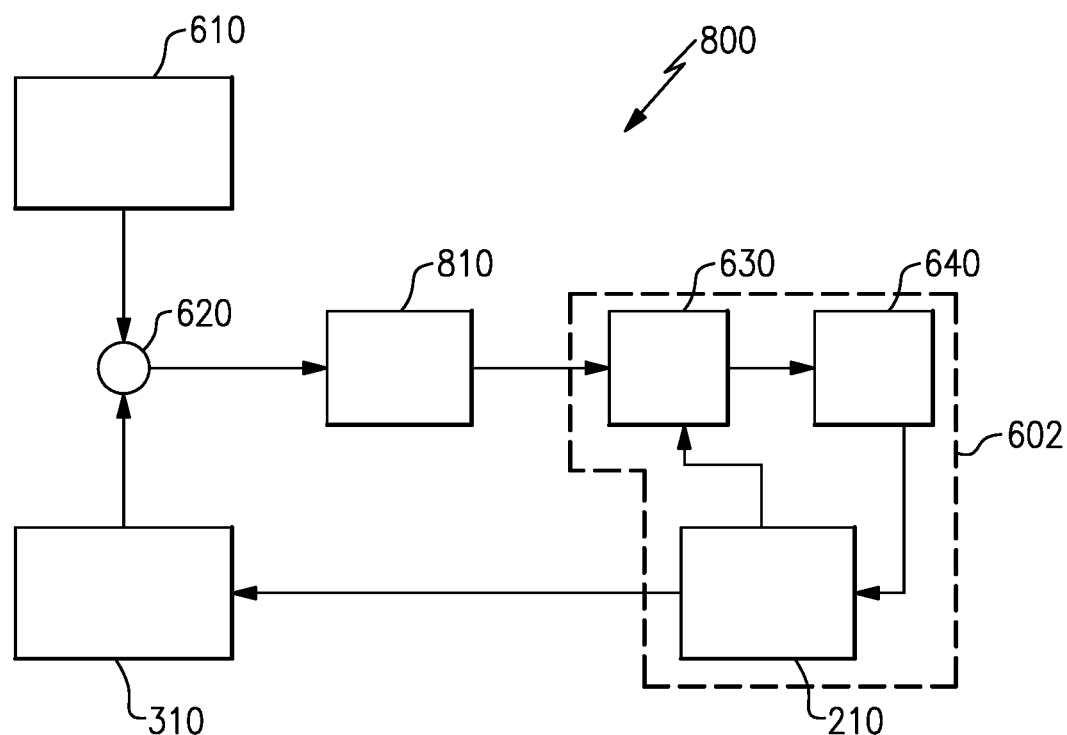
FIG. 8 schematically illustrates a control architecture for controlling the vehicle system transfer function of FIG. 3, including a thermal effector optimization component.

FIG. 8 schematically illustrates an exemplary control system 800 including a modification to the control system 600 of FIG. 6, with an additional effector optimizer 810 added between the comparison 620 and the thermal effector system 602. The optimizer 810 applies a rank, or weighting factor, to each device so that more effective, or preferred in the case of personalized profiles, devices have a higher weight than less effective or less preferred devices. The weighting applied by the optimizer 810 causes the controllers 630 to apply more control "effort" to preferred (or more effective) devices and reduces the control effort applied to non-preferred (or less effective) devices. The particular weighting of the thermal effector systems 602 is dynamic and can change over time, with environmental conditions, or based on user preferences. By way of example, a particular weighting rank or profile may be applied to thermal effector systems 602 when an exterior temperature is below a certain threshold temperature. Alternatively, a different weighting profile may be applied when a vehicle power supply is below a threshold percentage and conservation of power is more important than how fast the comfort level is reached.

In one example, a distinct chart can be utilized for distinct thermal effector operations including heating operations, heating operations starting below a threshold temperature, cooling operations, and cooling operations starting above a threshold temperature.

The optimizer 810 operates by ranking the thermal effector systems 602 in order of preferences and applying the preference to the control values as a weighting factor. The overall rank of each thermal effector system 602 is determined by multiplying a user preference parameter by a device effectiveness parameter. The user preference parameter is a stored value that indicates the particular user's preference for or against the thermal effector system 602. The device effectiveness parameter is a scalar value representing the efficiency of converting vehicle power to heating or cooling and the speed at which the device reaches a set point.

The user preference parameter can be retrieved from a stored user profile including specific users whose preferences are learned over time, and at least one generic user profile that operates as a starting point for the preference weighting. For the specific users, the profile is learned over time and reflects fine tuning that a specific user may apply to the thermal effector systems 602. By way of example, if a user routinely turns down one specific thermal effector system 602 the user profile is updated to decrease the weighting applied to that thermal effector system 602.

Further, the specific weightings and effectiveness of each thermal effector system 602 is dependent on the operation being performed by the thermal effector system 602 and can change when a different operation is performed. By way of example, one thermal effector system 602 may be highly efficient at providing heat in a heating operation, but inefficient at removing heat in a cooling operation. This thermal effector system 602 would then be applied a high rank during heating and a low rank during cooling.

The combination of user preference and effectiveness creates a single scalar weight value for each thermal effector system 602, and the error signal provided from the combination 620 is multiplied by the scalar weight value before the error signal is provided to the corresponding thermal effector system 602.

With continued reference to FIG. 8, FIG. 9 includes an exemplary weighting chart 900 contained within the optimizer 810. The weighting chart 900 includes a device index column 910, which defines a device index number uniquely identifying each device for controller identification purposes. In the exemplary chart 900, there are 6 devices, although a practical implementation can include any number of devices. In addition to the index column 910, a device type column 920 identifies what type of device corresponds to the specific index. By way of example, the device types for a heating system can include a head convective heater (A), a seat conductive heater (B), a seat convective heater (C), a local conductive heater (D), a global conductive heater (E), a floor conductive heater (F), and a local resistive heater (G).

A user preference column 930 and a thermal effectiveness column 940 each provide a ranking from 0 to 2 indicating the weight applied for the corresponding user preference or thermal effectiveness of the corresponding device with a 2 indicating the most preferred or effective, and a 0 indicating that the thermal effector corresponding to that row should not be utilized. The thermal effectiveness of the thermal effector is the power delivered to the occupant divided by the power consumed by the thermal device. This value is then normalized on the scale of 0-2. A combined weight column 950 provides a combined weight that is the result of multiplying the user preference value and the thermal effectiveness value. The combined weight column 950 drives the ordering of the chart, with the highest combined weight (thermal effector A) appearing at one end and the highest combined weight (thermal effector G) appearing at the other end. The combined weight from column 950 is the value applied to the feedback control signal of the corresponding thermal device by the optimizer 810. The weight is applied by multiplying the error value of the corresponding thermal effector by the combined weight value from column 950 for that thermal effector.

A device power column 960 lists the amount of power expected to be used by the thermal effector system to achieve the thermal operation. A cumulative device power column 970 lists the total amount of power expected to be used by the thermal effector system in that row combined with the expected power expenditure of all of the thermal effector systems below it (i.e. all thermal effector systems having a higher rank).

A power limit column 980 defines a limit on the amount of power that is allowed to be used by the thermal system of a given row in order to prevent a power budget of the vehicle from being exceeded. Three types of entries 982, 984, 986 are present in the power budget column 980. An entry 982 indicating "no limit" defines that there are no power budget limitations on the thermal effector system of that row. An entry 984 indicating "0" defines that the thermal effector system of that row is not provided any power during the thermal operations, and thus will not be operated.

The third entry type 986 indicates a numeric power budget that is less than the corresponding entry in the device power column 960, but greater than 0. The value in the third entry type provides an amount of power that can be consumed by the corresponding thermal device in the thermal operation before the corresponding thermal device is deactivated. Depending on the type of device and the type of controls, the power limit can be a cut off threshold, where the device stops operating when the threshold is exceeded, or the power limit can be averaged over time causing the thermal operations of the corresponding thermal effector to be reduced, and allowing the operations to continue across the entire thermal operation. The power limit column 980 is only utilized in examples where the thermal system is provided with a limited power budget.

The specific values in each column 930, 940, 950, 960, 970, and 980 are situational and will vary depending on the circumstances and conditions that the thermal operation is occurring in. By way of example, the entries in the user preference column 930 are learned over time for each given user, and are adjusted based on the user's custom tweaks to the thermal system. Similarly, the thermal effectiveness column 940 depends on exterior conditions, such as temperature and humidity, and are adjusted using established rules. The established rules can be based on empirical testing, neural network learning, or any similar method.

The entries in the device power column 960 are estimates of the amount of power that the thermal effector uses to achieve the desired temperature and flowrate. The estimates depend on the specific thermal operation and conditions and are determined by the controller for the thermal device according to any known estimation. As described above, the entries in the cumulative device power column 970 are dependent on the device power column 960 entries and on the order of the columns determined by the combined weight column 950.

Figure 10:
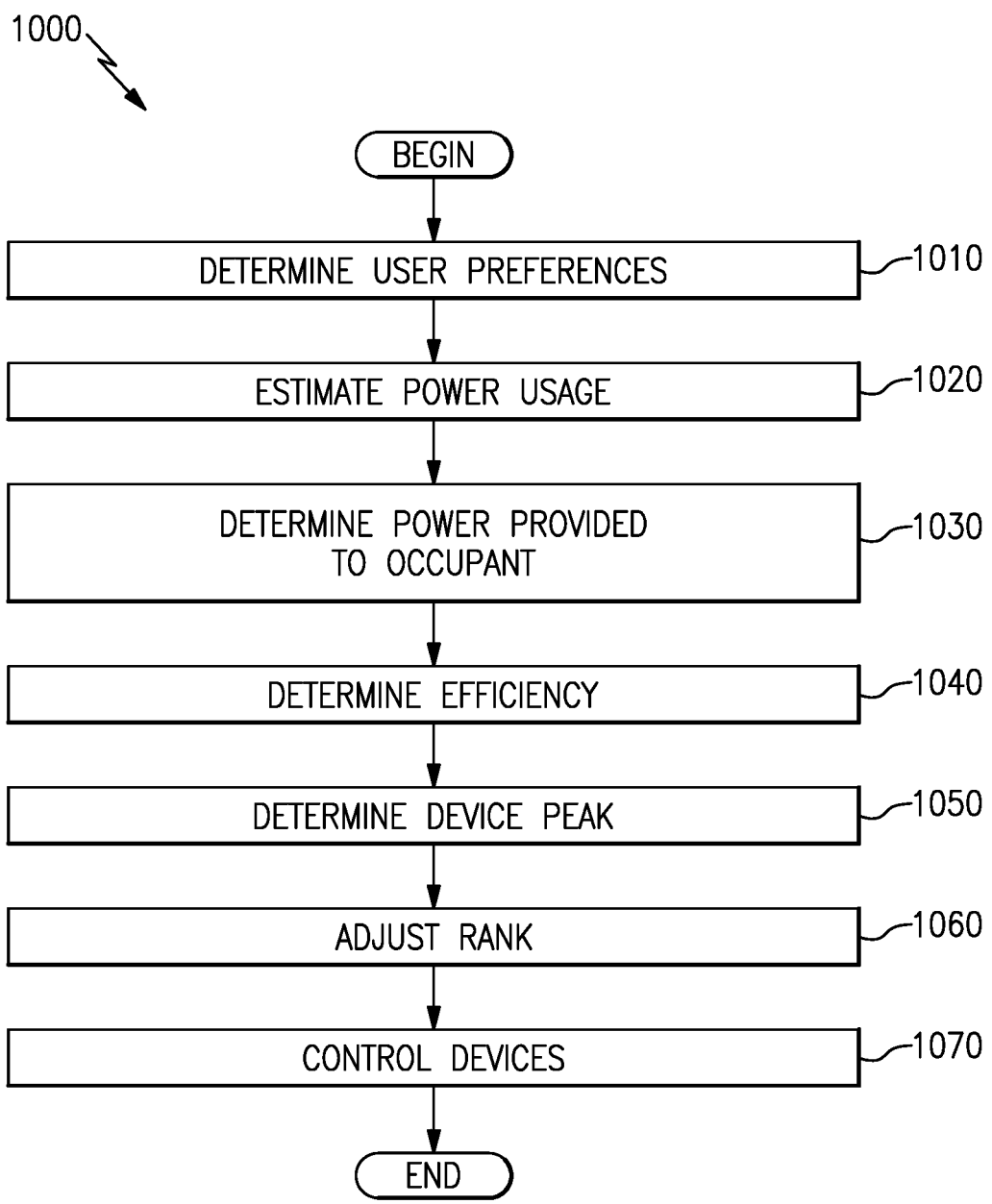
FIG. 10 is a flowchart illustrating a weighted thermal operation without a specific weighting constraint.
Figure 11:
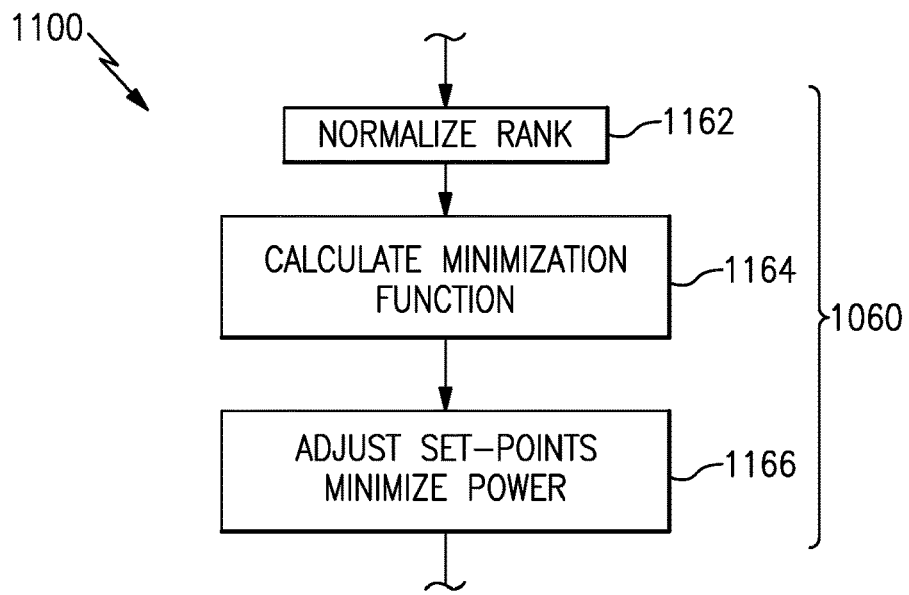
FIG. 11 is a flowchart illustrating the thermal operation minimizing power usage to reach a comfort setpoint.
Figure 12:
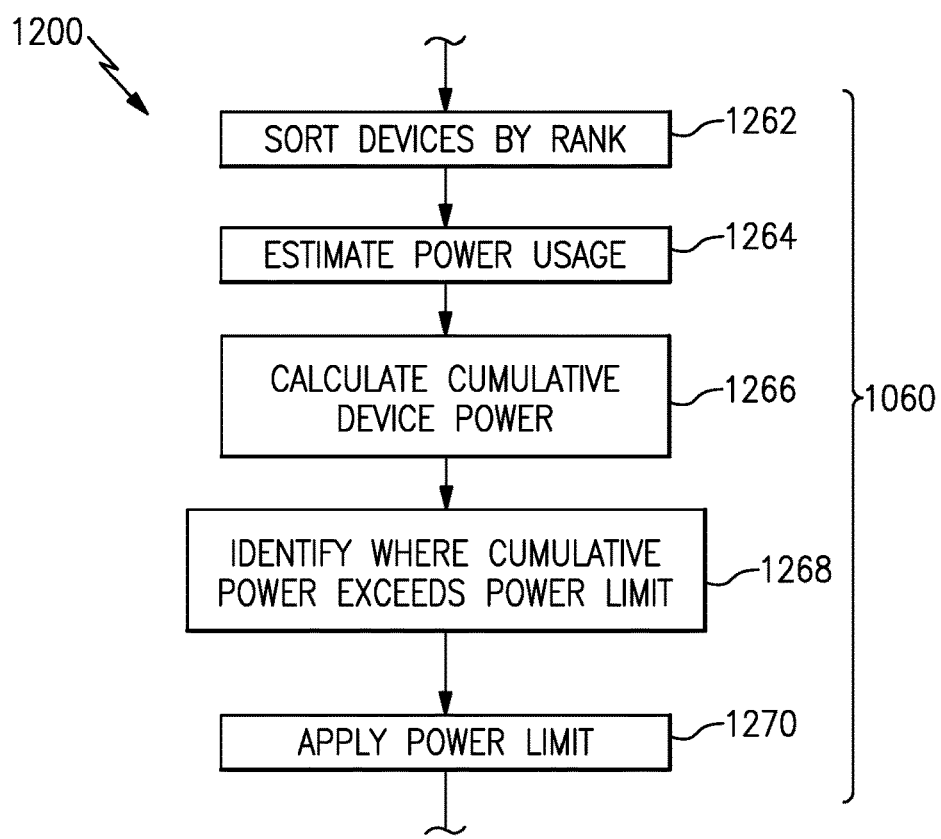
FIG. 12 is a flowchart illustrating the thermal operation of FIG. 11 under a power budget constraint.

With continued reference to the control system of FIGS. 8 and 9, FIGS. 10, 11 and 12 are flowcharts of the creation of the rank table 900 (FIG. 9) for the control system of FIG. 8, with FIG. 10 illustrating a generic operation, FIG. 11 illustrating an operation minimizing power usage to the occupant thermal comfort setting, and FIG. 12 illustrating an operation limited by a power budget.

The generic operation 1000 of FIG. 10 begins by determining a user preference in a "Determine User Preference" step 1010. The user preference can be manually entered by a user, based on a stored user profile, or a generic Once the user preference has been determined, the controller determines an estimated power required by each thermal device to achieve the thermal operation in a "Estimate Power Usage" step 1020. After determining the power required to reach the comfort setpoint, the controller determines how much power from each thermal effector reaches the occupant in a "Determine Power Provided to Occupant" step 1030. Once the power used and the power provided has been estimated for a thermal effector, the effectiveness, or efficiency, of the thermal effector is determined by dividing the power provided to the occupant by the estimated power used in a "Determine Efficiency" step 1040.

After determining the efficiency of each thermal effector in the thermal system, the controller ranks the devices by multiplying the determine efficiency with the determined preference in a "Determine Device Rank" step 1050. Depending on the mode of operation (e.g. power optimization, power budget, etc.) the controller adjusts the ranking of the devices in an "Adjust Rank" step 1060. Once any adjustments have been performed, the thermal effectors are controlled according to the error values modified by the device ranks as described above with regards to FIG. 8 in a "Control Devices" step 1070.

FIG. 11 illustrates a flowchart 100 of the rank adjustment step 1060 of FIG. 10 when applied to minimize power usage. The rank adjustment begins by normalizing the rank determined by multiplying the efficiency by power usage in a "Normalize Rank" step 1162. The normalized rankings are then applied to a power minimization function (Eqn. 1, below):

$$P = 1 - \left\{ \frac{ \left[ f_{bias,1} \frac{\sum_{i=n1}^{i=n2}\left[\left(\frac{1}{bi}\right)\left(\frac{T_{set,i} - T_{max,i}}{T_{min,i} - T_{max,i}}\right)\right]}{\sum_{i=n1}^{i=n2}\left(\frac{1}{bi}\right)} + f_{bias,2} \frac{\sum_{i=n1}^{i=n2}\left[\left(\frac{1}{bi}\right)\left(\frac{h_{set,i} - h_{max,i}}{h_{min,i} - h_{max,i}}\right)\right]}{\sum_{i=n1}^{i=n2}\left(\frac{1}{bi}\right)} \right] }{(2)} \right\} \quad \text{Equation 1}$$

In equation 1, the first term ($f_{bias1}$) includes $T_{set}$, referring to the air temperature or surface temperature for a given thermal effector, $T_{min}$, referring to a minimum acceptable value in the range for the selected thermal effector, and $T_{max}$, referring to the maximum acceptable value in the range for the selected thermal effector and is used for both conductive devices and convective devices. The second term ($f_{bias2}$), includes h set referring to the set heat flux for the given thermal effector, $h_{max}$ referring to the maximum heat flux for the given thermal effector, and $h_{min}$ referring to the minimum heat flux for the given thermal effector. The second term, and the division by 2 is only utilized for convective devices.

The minimization function (Equation 1) determines a P value representing the estimated power usage of the thermal effector, and the rank of each thermal is adjusted by altering the device set points within the predefined limits to identify a minimum power usage required to achieve the set points in an "Adjust Set-Points to Minimize Power" step 1166. The minimized power rankings are then used to control the device, as in FIG. 10.

When the thermal effector system is allocated a limited amount of power the vehicle controller operates to ensure that not only is power usage minimized, but also that the allocated power budget is not exceeded. By way of example, this can occur when an electric vehicle has below a certain amount of charge remaining, and the controller needs to ensure that sufficient charge exists to operate the vehicle until a charging station has been reached. To ensure that power budgets are not exceeded, the process of FIG. 11 is modified, and the modified process 1200 is illustrated in FIG. 12. Initially, the devices are ranked as described in the process of FIG. 10 and the devices are sorted by their rank in a "Sort Devices by Rank" step 1262. The sorting provides an ordered list of devices according to the power minimization ranking. Once sorted, the expected power usage of each device is estimated in an "Estimate Power Usage" step 1263 and the cumulative device power of each device is determined in a "Calculate Cumulative Device Power" step 1266.

After determining the cumulative device power, the controller identifies which thermal effector's estimated power usage would cause the cumulative power to exceed the provided power limit in an "Identify Where Cumulative Power Exceeds Power Limit" step. The identified thermal effector is indexed to provide a power limit on the operations of the thermal effector, each thermal effector below the indexed thermal effector is provided no limit, and each thermal effector above the indexed thermal effector is disabled and/or turned off in an "Apply Power Limit" step 1270.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A microclimate system for a vehicle occupant comprising:
    multiple microclimate thermal effectors, each of the microclimate thermal effectors having a corresponding thermal effector controller and being configured to at least partially control an occupant thermal comfort, each of the microclimate thermal effectors including at least one sensor configured to determine a microclimate parameter corresponding to at least one microclimate thermal effector of the multiple microclimate thermal effectors; and
    a microclimate system controller in communication with the microclimate thermal effectors, the microclimate system controller including a plurality of first transfer functions, each of the first transfer functions modeling a corresponding microclimate thermal effector in the plurality of microclimate thermal effectors, and a system transfer function modeling the microclimate system, wherein each of the first transfer functions is nested within the system transfer function such that the system transfer function models the microclimate system including at least a portion of the impact each thermal effector has on each other thermal effector, wherein the microclimate system controller is configured to control the microclimate thermal effectors using the system transfer function and the first transfer functions.

2. The microclimate system of claim 1, wherein at least one of the microclimate thermal effectors corresponds to at least two of the first transfer functions.

3. The microclimate system of claim 2, wherein a first of the at least two transfer functions models a heating operation of the at least one of the microclimate thermal effector.

4. The microclimate system of claim 3, wherein a second of the at least two transfer functions models a cooling operation of the at least one of the microclimate thermal effector.

5. The microclimate system of claim 1, wherein the nesting of the first transfer functions within the system transfer functions includes utilizing outputs of the nested first transfer functions as inputs of the system transfer function.

6. The microclimate system of claim 1, wherein the microclimate system controller is configured to subtract an output of the system transfer function from an occupant setpoint thereby generating a thermal comfort error for each microclimate thermal effector and providing each thermal comfort error to the controller of the corresponding microclimate thermal effector.

7. The microclimate system of claim 6, wherein each of the first transfer functions provides an output to the corresponding thermal effector controller.

8. The microclimate system of claim 7, wherein at least one thermal effector controller is a dedicated thermal effector controller.

9. The microclimate system of claim 8, wherein at least one thermal effector controller is a dedicated subcomponent of the microclimate system controller.

10. The microclimate system of claim 1, wherein the microclimate thermal effectors are selected from the group comprising climate controlled seats, head rest/neck conditioner, climate controlled headliner, steering wheel, heated gear shifter, heater mat, and mini-compressor system.

11. The microclimate system of claim 1, wherein the multiple microclimate thermal effectors includes at least one convective thermal effector and at least one conductive thermal effector.

12. The microclimate system of claim 1, wherein the system transfer function includes a heating operations model and a cooling operations model.

13. A method for controlling a microclimate system having multiple thermal effectors, the method comprising:
determining an occupant comfort level setpoint for the microclimate system;
determining device setpoints for each of the thermal effectors based on the occupant comfort level setpoint; and
controlling the thermal effectors to the corresponding device setpoints using a feedback control loop, the feedback control loop including a system transfer function and a plurality of device transfer functions where each of the plurality of device transfer functions is nested in the system transfer function, the device transfer functions each modeling individual thermal effectors and the system transfer function modeling an affect each individual thermal effector has on the effectiveness of each other thermal effector.

14. The method of claim 13, further comprising measuring a plurality of parameters using a plurality of sensors and providing the measured parameter to an input of at least one device transfer function of the plurality of device transfer functions.

15. The method of claim 14, wherein the feedback control loop includes comparing an output of the system transfer function to the determined device setpoints to determine at least one error value corresponding to each thermal effector and providing the error value to a corresponding thermal effector controller.

16. The method of claim 15, wherein the feedback control loop further includes providing the at least one output of each device transfer function to the corresponding thermal effector controller, the at least one output providing a calculated current thermal state including at least one of an occupant temperature and a heat flux.

17. The method of claim 16, wherein the calculated current thermal state defines at least an occupant temperature and a heat flux.

18. The method of claim 14, wherein each transfer function of the plurality of transfer functions receives at least one parameter of the plurality of measured parameters and provides at least one output to an input of the system transfer function.

19. The method of claim 15, wherein at least two of the plurality of device transfer functions correspond to a single thermal effector, with a first of the at least two device transfer functions modeling heating operations of the thermal effector and a second of the at least two transfer functions modeling cooling operations of the thermal effector.

20. The method of claim 13, wherein the multiple thermal effectors includes at least one convective thermal effector and at least one conductive thermal effector.

* * * * *